United States Patent [19]

Krivohlavek

[11] Patent Number: 5,242,492
[45] Date of Patent: Sep. 7, 1993

[54] MICROSURFACING SYSTEM

[75] Inventor: Dennis Krivohlavek, Claremore, Okla.

[73] Assignee: Asphalt Technology & Consulting, Inc., Claremore, Okla.

[21] Appl. No.: 699,362

[22] Filed: May 13, 1991

[51] Int. Cl.$^5$ .................................................. C09D 195/00
[52] U.S. Cl. ........................................ 106/269; 106/277
[58] Field of Search .................................. 106/269, 277

[56] References Cited

U.S. PATENT DOCUMENTS

| | | | |
|---|---|---|---|
| 3,738,852 | 6/1973 | Doi et al. | 106/277 |
| 3,859,227 | 1/1975 | Dwyer | 252/311.5 |
| 4,137,204 | 1/1979 | McDonald | 260/28.5 |
| 4,172,046 | 10/1979 | Doi et al. | 106/277 |
| 4,338,136 | 7/1982 | Goullet et al. | 106/277 |
| 4,450,011 | 5/1984 | Schilling et al. | 106/277 |
| 4,462,840 | 7/1984 | Schilling et al. | 106/277 |
| 4,561,900 | 12/1985 | Brouard et al. | 106/246 |
| 4,562,236 | 12/1985 | Lin | 527/400 |
| 4,609,696 | 9/1986 | Wilkes | 524/59 |
| 5,098,604 | 3/1992 | Brouard et al. | 106/277 |
| 5,137,572 | 8/1992 | Krivohlavek | 106/277 |

Primary Examiner—David Brunsman
Attorney, Agent, or Firm—Head & Johnson

[57] ABSTRACT

A rapid set microsurfacing system which comprises 36% water, 2% of the quaternized or unquaternized emulsifier, 1.5% acid (HCl), 56.5% asphalt residue, and 4% latex polymer [1.5% water and 2.5% rubber]. The quaternized or unquaternized emulsifier comprising an amidoamine and imidazoline mixture prepared from the combination of a tall oil fatty acid rosin mixture with a rosin content between 8 to 40 percent and a polyamine of either ethylenediamine, diethylenediamine, diethylenetriamine, triethylenetetramine, tetraethylene pentamine, or aminoethylethanolamine. The break control agent used can be a hydrophilic, alkylated vinylpyrrolidone polymer (commercially available as Ganex® P-904 Polymer); polypropylene glycol; polysiloxane compounds such as trimethylsiloxy terminated polydimethylsiloxanes, silanol terminated polymethylsiloxane, T-structure polydimethylsiloxanes with styrene, vinyl chloride, ethylene, propylene or butadiene; the saponified or unsaponified microsurfacing emulsion or a combinations of these chemicals.

10 Claims, No Drawings

MICROSURFACING SYSTEM

BACKGROUND OF THE DISCLOSURE

Field of the Invention

This invention relates to new and useful emulsions and to the process of preparing these emulsions for use in a microsurfacing system. More particularly, this invention relates to the formation of new emulsions which are made from tall oil fatty acid rosin mixtures having a rosin content between 8-40%. The rosin content provides an emulsion in which it is easier to control the break and set times during field application. The emulsions of this invention expand the envelop of operation thereby allowing the use of the microsurfacing system in environments and applications that were up to this point prohibited.

BACKGROUND OF THE INVENTION

Asphalt emulsions employing a variety of applications is very well known in the art. These emulsions can be cationic, anionic or non-ionic depending upon the emulsifier. The set times can be rapid set, medium set and slow set.

Asphalt use has a wide variety of applications. These include paving of road and parking lot surfaces. In many instances the asphalt employed in these applications involve a "hot mix." Hot mixes involve heating the asphalt cement and mixing the aggregate into a molten mass at temperatures ranging from 250 to 350 degrees Fahrenheit. Cut-backs have hydrocarbon solvents added to the asphalt to improve mixing at temperatures below normal hot mix parameters and to achieve the desired viscosity. However, both cut-backs and hot mixes have many disadvantages.

An alternative to the hot mix applications is the microsurfacing system. Microsurfacing systems involve using water and a variety of chemicals mixed in with the asphalt cement to create an emulsion. A break control agent is also added to control the break point of the emulsion.

In order for the emulsifier to perform its ultimate function as a cementing and waterproofing agent, the asphalt must separate from the water phase. Typically, emulsions are designed to break as the water is removed either through absorption in the aggregate, chemical reaction with the aggregate or from evaporation. This allows the asphalt droplets to coalesce and form a continuous film around the aggregate. The break or set time is the rate in which the asphalt droplets separate from the emulsion phase.

A significant problem within the industry is control of the emulsion's break point. The break point of an emulsion is influenced by a variety of variables. Composition variables include (1) the molecular structure of the emulsifier, (2) the quantities of the various components, (3) the efficiency of the break control agent, (4) the temperature of the mix components at the time of mixing, (5) ratio of all the components (6) aggregate type and gradation, (6) total amount of water in the mixture, (7) amounts and types of polymer, emulsifier and break control agent. Environmental variables include (1) surface temperature, (2) air temperature, (3) aggregate temperature, (4) amounts of sunshine, (5) wind speed, (6) humidity, and (7) rainfall before, during or after lay down of the microsurfacing system. Construction factors also influence the break point which include the type of equipment chosen to apply the microsurfacing system and the skill of the crew operating the equipment.

Microsurfacing systems involve the use of specialized equipment that have the ability to mix aggregate, portland cement, water, break control agents (solution or chemical) and a special type of extremely fast breaking polymer modified asphalt emulsion. This special type of extremely fast breaking polymer modified asphalt emulsion is called the microsurfacing emulsion.

When applied in a predetermined thickness on a road surface or other terrain, a specialized piece of equipment referred to as a microsurfacing machine, may operate continually as it travels the road or across the terrain being paved. Typically, the microsurfacing system is used for resurfacing roads. However, the microsurfacing system can be used to resurface parking lots, construct new parking lots and construct new roads. Once applied to the road surface, the microsurfacing emulsion will then break and the asphalt will set, allowing the passage of rolling traffic in one hour. Rolling traffic is defined as the ability of the microsurfacing system to withstand the pressure exerted by a standard 1500 to 2000 pound automobile traveling at 40 miles per hour. An acceptable microsurfacing system will show no indentation or other markings or disfigurement to the surface at the end of the one hour time period.

The ability of the microsurfacing system to handle rolling traffic within one hour makes it desirable for use in the construction or resurfacing of interstate highways, city freeway systems and any other areas where high volumes of traffic demand a road surface be placed in a quick and expedient manner.

A major problem associated with emulsifiers is their poor adhesion to aggregates such as sand, gravel, crushed rock, slag and crushed limestone. A key requirement of the microsurfacing system is the ability of the microsurfacing emulsion to remain stable enough to completely coat and mix with the aggregate and other components of the mix before exiting the microsurfacing machine regardless of the above indicated weather or construction conditions. The ability of the microsurfacing emulsion to remain stable enough to mix with the aggregate and the other components and exit the machine is normally termed "controlling the break of the system."

It has often been a problem for those skilled in the art of emulsion technology and microsurfacing emulsion technology, to control the break point of the microsurfacing system with a given aggregate source, emulsifier type used in the microsurfacing emulsion and the general weather conditions during actual placement of the microsurfacing system. A need exists for a microsurfacing system that will allow for greater flexibility and control of the type of aggregate selected for use, amount of cement present in the mix, the amount and type of break control agent in the mix. Meanwhile maintaining the microsurfacing emulsion or the mix at a temperature greater than 110 to 115 degrees Fahrenheit.

The ability to satisfy the above stated needs will allow for more economic incentive to use the microsurfacing systems in actual construction practice. Examples of some of the economic incentives will be lower quantities of microsurfacing emulsion returned to the manufacturer due to poor field performance, more useful emulsifier system for making the microsurfacing emulsion, the ability to use aggregates from locations closer to the construction site which lowers freight costs for the contractor and an overall improvement in the construction operation due to the improvements in the microsurfacing system.

SUMMARY OF THE INVENTION

It is well known within the asphalt application industry that combinations of amidoamines and imidazolines created by the reaction of various amine compounds and fatty acids that contain less than twenty (20) carbon atoms in the liptophillic portion of the molecule are suitable for use as emulsifiers for making microsurfacing emulsions. Previous to the teachings of this patent no work has been found to indicate or illustrate the advantages of making these amidoamine and imidazoline moieties with the liptophillic portions of the molecule having greater than twenty (20) carbon molecules in its structure.

Therefore, this patent illustrates the advantages of having chemical structures of greater than twenty (20) carbon molecules in the liptophillic portion of the molecule. It is further the purpose of the teachings of this work to demonstrate the usefulness of quaternization of the amine portion(s) of the amidoamine and imidazoline mixture made with greater than twenty (20) carbon molecules in its liptophillic portion.

The purpose of the teaching disclosed in this patent are therefore threefold. First, to illustrate how chemical manipulation and modification of the molecular structure of the emulsifier molecule used to make the microsurfacing emulsion can allow for greater control of the break point of the emulsion. This allows the microsurfacing system to handle a greater variety of aggregate types. Second, to illustrate the effect of the use of break control agents that improve the control of the mixing time and break point of the microsurfacing system. Third, to illustrate the improved effects of the emulsifier used to create the microsurfacing emulsion has on the specification tests (referred to as ASTM Test) established and set by the federal and state highway departments.

DETAILED DESCRIPTION OF THE PREFERRED EMBODIMENT

The key aspect of this invention is the use of fatty acids with $C_{20+}$ hydrocarbons, preferably a dimerized tall oil fatty acid rosin mixture with a rosin content of between 8 and 40%. This invention involves the production of emulsions by a similar method but combining the fatty acid with one of six different polyamine compounds to achieve the desired product.

A dimerized tall oil rosin is added to a polyamine which can be either ethylenediamine, diethylenediamine, diethylenetriamine, triethylenetetramine, tetraethylene pentamine, or aminoethylethanolamine to produce a mixture of amidoamine and imidazoline. The amidoamine/imidazoline mixture may be quaternized by the addition of one of the following: dimethyl sulfate, diethyl sulfate, dipropyl sulfate or epichlorohydrin. Quaternization of the amidoamine and imidazoline mixture is not required unless longer break and set times are desired from the emulsion. The greater the degree of quaternization, the higher the stability, and therefore the break time is slower. The preferred mixture of amidoamine/imidazoline mixture is 60–70% amidoamine and 30–40% imidazoline.

The quaternized or unquaternized compound is then added with water and acid to form a soap solution. Selection of one of the compounds diethylenediamine or diethylenetriamine is desired for faster break times. Utilization of compounds tetraethylene pentamine or aminoethylethanolamine will achieve slower break times.

The soap solution is formed by adding acid to water and then adding the quaternized or unquaternized amidoamine and imidazoline mixture. The pH is adjusted by the amount of acid introduced into the soap solution in the range 1.5 to 2.5.

The emulsion is typically formed by the combination of 38–42% water, 1–3% of the quaternized or unquaternized emulsifier, 1–2% acid (HCl), 53–59% asphalt residue, and 4% latex polymer [1.5% water and 2.5% rubber]. The preferred combination is 36% water, 2% of the quaternized emulsifier, 1.5% acid (Hcl), 56.5% asphalt residue, and 4% latex polymer [1.5% water and 2.5% rubber]. The asphalt residue can consist of but is not limited to any one or combination of the following: asphalt modified with a polymer, styrene butadiene styrene (SBS) block copolymer, styrene isoprene styrene (SIS) block copolymer, ethylene vinyl acetate (EVA), ethylene methylic acetate (EMA), ethylene acrylic acetate (EAA), or a combination of two or more or these compounds.

To control the break of the emulsion, one of the following chemicals can be added: a hydrophilic, alkylated vinylpyrrolidone polymer (commercially available as Ganex® P-904 Polymer); polyethylene glycol; polypropylene glycol; polysiloxane compounds such as trimethylsiloxy terminated polydimethylsiloxanes, silanol terminated polymethylsiloxane, T-structure polydimethylsiloxanes with styrene, vinyl chloride, ethylene, propylene or butadiene; unsaponified microsurfacing emulsifier; or a combinations of these chemicals.

The break control agent can be added either during the formation of the soap solution or it can be added to the microsurfacing system during the laydown operation. The quantity of break control agent being added to the microsurfacing system is dependent upon the desired break time which is influenced by the previously listed factors which include component factors, environmental factors and construction factors.

EXAMPLE 1

Charge reactor vessel with one mole of a dimerized tall oil fatty acid rosin mixture comprising 8–40% rosin (commercially available as Fatty Acid 7002). While stirring add two mole of either ethylenediamine, diethylenediamine, diethylenetriamine, triethylenetetramine, tetraethylene pentamine, or aminoethylethanolamine and heat to 120 to 150 degrees Fahrenheit while stirring and using a vacuum and water removal system. Turn on condenser and heat to 280 to 300 degrees fahrenheit while stirring.

For ethylenediamine the reaction is as follows:

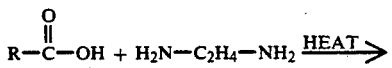

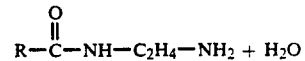

formation of imidazoline in its unquaternized form:

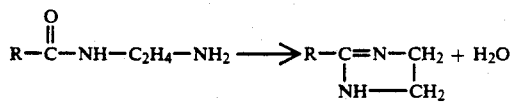

For diethylenediamine the reaction is as follows:

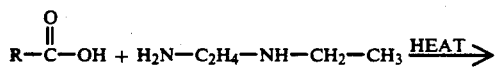

formation of imidazoline in its unquaternized form:

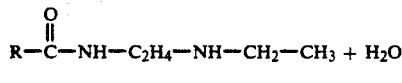

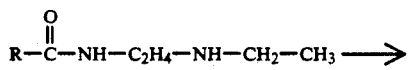

For diethylenetriamine the reaction is as follows:

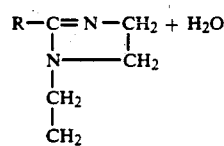

formation of imidazoline in its unquaternized form:

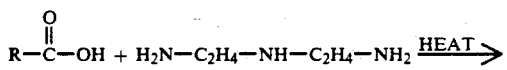

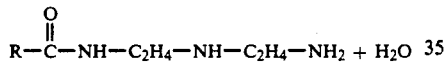

-continued

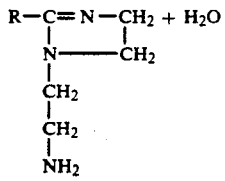

For triethylenetetramine the reaction is as follows:

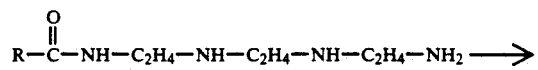

formation of imidazoline in its unquaternized form:

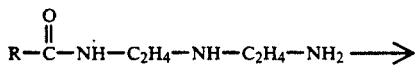

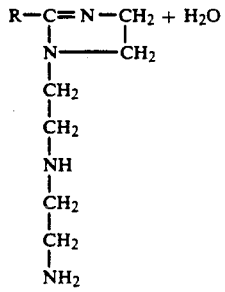

For tetraethylenepentamine the reaction is as follows:

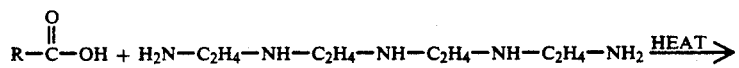

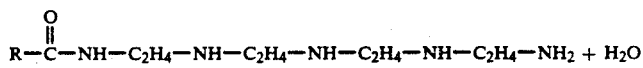

formation of imidazoline in its unquaternized form:

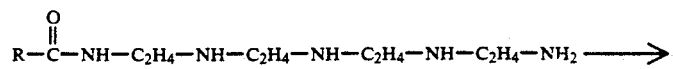

-continued

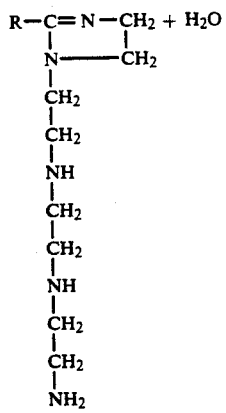

For aminoethylethanolamine the reaction is as follows:

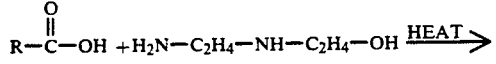

formation of imidazoline in its unquaternized form:

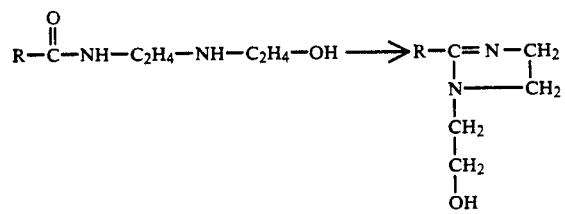

where R is $C_{20+}$ tall oil fatty acid mixture with rosin content between 8 and 40%. Collect the distillate in the trap while heating to 400 degrees Fahrenheit as distillation allows. As the water distillation slows and then ceases, the amidoamine reaction is going to completion. If desired, samples may be taken at this time for analysis of the amidoamine content. In our reaction, one mole of water and one mole of amidoamine was obtained.

Upon the cautious application of vacuum, the imidazoline reaction will begin. Apply vacuum pressure as needed, to maintain the distillation until the desired amount of water is removed or the system has been under full vacuum (30 cm Hg) for one hour at 400 degrees Fahrenheit.

Lastly, cool the product and perform the analysis.

EXAMPLE 2

Charge reactor vessel with one mole of a dimerized tall oil fatty acid rosin mixture comprising 8–40% rosin (commercially available as Fatty Acid 7002). While stirring add one mole of either ethylenediamine, diethylenediamine, diethlenetriamine, triethylenetetramine, tetraethylenepentamine, or aminoethylethanolamine and heat to 120 to 150 degrees Fahrenheit while stirring and using a vacuum and water removal system. Turn on condenser and heat to 280 to 300 degrees fahrenheit while stirring.

For ethylenediamine the reaction is as follows:

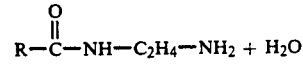

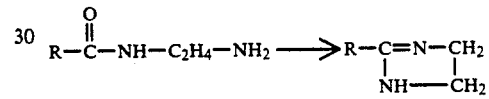

formation of imidazoline in its unquaternized form:

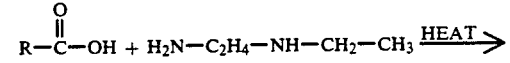

For diethylenediamine the reaction is as follows:

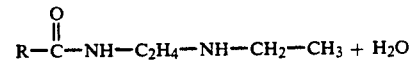

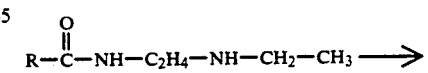

formation of imidazoline in its unquaternized form:

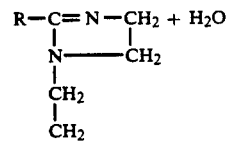

For diethylenetriamine the reaction is as follows:

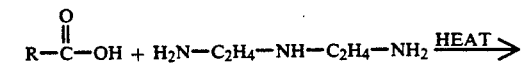

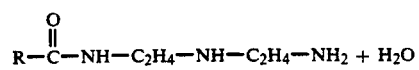

formation of imidazoline in its unquaternized form:

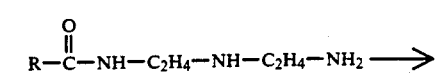

-continued

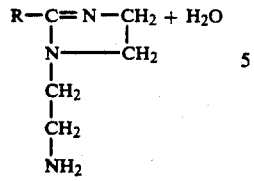

For triethylenetetramine the reaction is as follows:

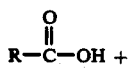

$$H_2N-C_2H_4-NH-C_2H_4-NH-CH_2-CH_2-NH_2 \xrightarrow{HEAT}$$

$$R-\overset{O}{\underset{\|}{C}}-NH-C_2H_4-NH-C_2H_4-NH-CH_2-CH_2-NH_2 + H_2O$$

formation of imidazoline in its unquaternized form:

$$R-\overset{O}{\underset{\|}{C}}-NH-C_2H_4-NH-C_2H_4-NH-C_2H_4-NH_2 \longrightarrow$$

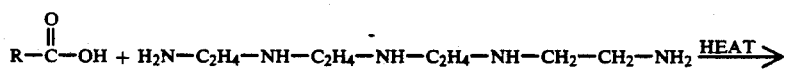

For tetraethylenepentamine the reaction is as follows:

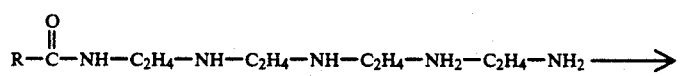

formation of imidazoline in its unquaternized form:

$$R-\overset{O}{\underset{\|}{C}}-NH-C_2H_4-NH-C_2H_4-NH-C_2H_4-NH_2-C_2H_4-NH_2 \longrightarrow$$

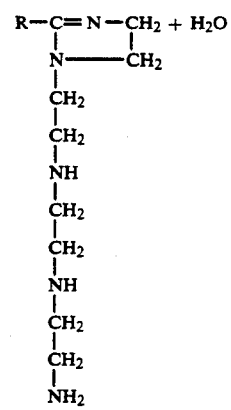

For aminoethylethanolamine the reaction is as follows:

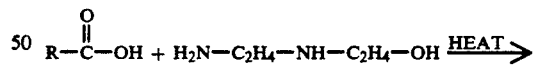

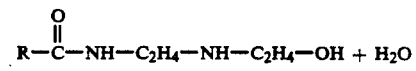

formation of imidazoline in its unquaternized form:

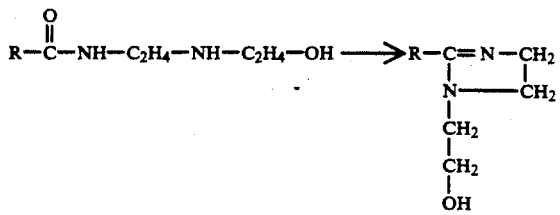

where R1 is $C_{20+}$. Collect the distillate in the trap while heating to 400 degrees Fahrenheit as distillation allows.

As the water distillation slows and then ceases, the amidoamine reaction is going to completion. If desired, samples may be taken at this time for analysis of the amidoamine content. In our reaction, one mole of water and one mole of amidoamine was obtained.

Upon the cautious application of vacuum, the imidazoline reaction will begin. Apply vacuum pressure as needed, to maintain the distillation until the desired amount of water is removed or the system has been under full vacuum (30 cm Hg) for one hour at 400 degrees Fahrenheit.

Lastly, cool the product and perform the analysis.

To achieve even slower break times the amidoamine and imidazoline mixture can be quaternized. To quaternize the amidoamine and imidazoline mixture, heat one mole of the mixture to 150 degrees Fahrenheit. To keep the mixture in a liquid form, methanol, ethanol, isopropyl alcohol, or polyethylene glycol can be added not to exceed 25% of the total volume of product. Remove the heat and add one mole of either dimethyl sulfate, diethyl sulfate, dipropyl sulfate or epichlorohydrin at a rate as to keep the reaction temperature below 180 degrees Fahrenheit. Add the remaining isopropyl alcohol to keep the product in solution. For 100% quaternization, after 15-20 minutes at 150 to 180 degrees Fahrenheit, adjust the final Ph to 6.8 to 7.0. Cool, pour into a container and store in a cool, dry place.

For ethylenediamine the reaction is as follows:

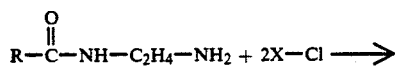

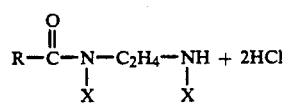

for cyclic ethylenediamine the reaction is as follows:

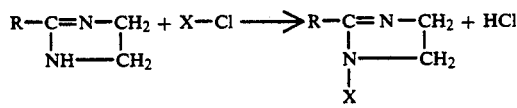

For diethylenediamine the reaction is as follows:

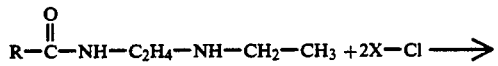

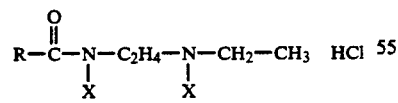

for cyclic diethylenediamine the reaction is as follows:

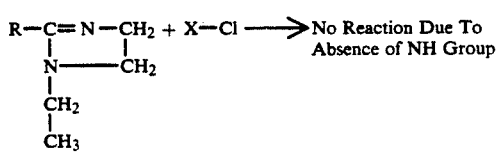

For diethylenetriamine the reaction is as follows:

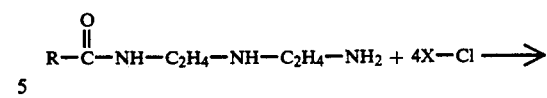

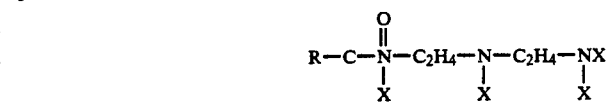

for cyclic diethylenetriamine the reaction is as follows:

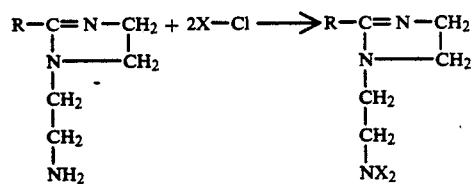

For triethylenetetramine the reaction is as follows:

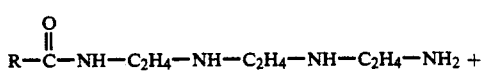

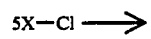

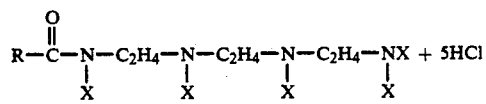

for cyclic triethylenetetramine the reaction is as follows:

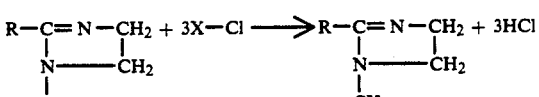

For tetraethylenepentamine the reaction is as follows:

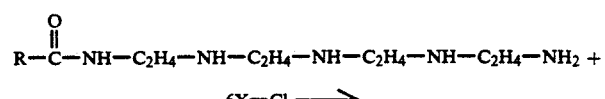

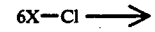

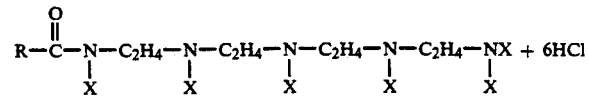

for cyclic tetraethylenepentamine the reaction is as follows:

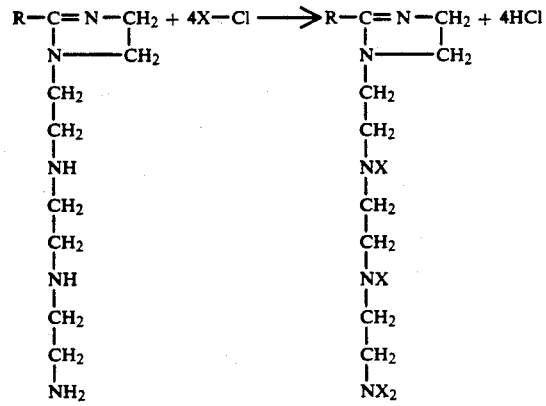

For aminoethylethanolamine the reaction is as follows:

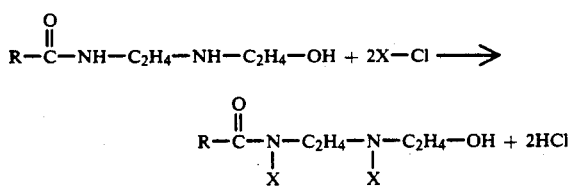

where R is $C_{20+}$ tall oil fatty acid mixture with rosin content between 8 and 40% and X is the quaterizing compound dimethyl sulfate, diethyl sulfate, dipropyl sulfate or epichlorohydrin.

EXAMPLE 3

This example describes the formation of the emulsion. The emulsion is formed by the combination of 32-40% water, 1-3% of the quaternized emulsifier, 1-2% acid (HCl), 53-59% asphalt residue, and 4% latex polymer [1.5% water and 2.5% rubber]. The preferred combination is 36% water, 2% of the quaternized emulsifier, 1.5% acid (HCl) for a pH of 1.5 to 2.0, 56.5% asphalt residue, and 4% latex polymer [1.5% water and 2.5% rubber based on the total emulsion].

First, using the percentages of components listed above, add 75-80% of the hydrochloric acid to the water. Next, while stirring add the unquaternized or quaternized amidoamine and imidazoline product and adjust the pH of the soap solution between 1.5 to 2.5 with the remaining hydrochloric acid.

The emulsion is formed by combining the remaining components. The latex polymer can be added to the emulsifier during the formation of the soap solution or the latex polymer can be added with the remaining components and mixed together by a colloid mill. The preferred amounts of components are listed in Table I.

TABLE I

| | |
|---|---|
| Emulsifier | 2.0% |
| Acid (Hcl) | 1.5% |
| Water (H$_2$O) | 36.5% |
| Asphalt | 56.0% |
| Latex Polymer[1] | 4% |

[1]Latex Polymer consisting of 37.5% water and 62.5% rubber

Many of the specifications issued for microsurfacing emulsions require a Penetration (ASTM test at 77° F.) range of fifty (50) to ninety (90) units, a minimum one hundred forty degree fahrenheit (140° F.) Ring and Ball Softening Point (ASTM Test) value and a minimum three thousand centipoise (3000 cP) Absolute Viscosity (ASTM Test) value on the asphalt Residue from Emulsion Distillation (ASTM Test at 350° F. maximum distillation temperature). Without proper selection of the emulsifier used in the creation and formation of the microsurfacing emulsion, the proper polymer and the proper asphalt, it is difficult for even those schooled in the art of microsurfacing technology to meet the specifications on the asphalt Residue from Emulsion Distillation. This problem limits the raw material sources available to the skilled technologists and as a result adversely effects the economic competitiveness of the product.

However, the use of tall oil fatty acid rosin mixtures with a rosin content between 8 to 40 percent can achieve ASTM tests results within acceptable ranges. The results of these tests are illustrated in Tables III, IV, V and VI.

For Tables III through V the data was complied from the use of the following components:

Aggregate used has trade usage name of "Miami Chert—Type II"

The microsurfacing mix is as follows:
100.0 g Aggregate <1.5% Moisture Content
1.5 g Portland Cement—Type I
8.5 g water (in addition to aggregate moisture)
0.5 g Break Control Agent
12.5 g Microsurfacing Emulsion comprising:
  2.0% Test Emulsifier of Desired Hydrocarbon Chain
  1.5% HCl or to Soap pH=1.5 to 2.0
  2.5% Radial SBS Block Copolymer
  56.5% Asphalt
  38.5% Water Molar ratio was 1:2 with the tall oil fatty acid rosin mixture and either ethylenediamine, diethylenediamine, diethylenetriamine, triethylenetetramine, triethylenepentamine, or aminoethylethanolamine with partial or full quaternization with each hydrocarbon species. The soap of pH 1.5-2.5, residue content 60.0% and 2.5% (by weight) Fina Oil & Chemical FinaPrene 401. The break control agent selected from alkylated polyvinylpyrrolidone which are hydrophilic or hydrophobic in nature; polysiloxane compounds of the structure silicone hydroxide, silicone amine; an organic acid and a mineral base; organic base with a mineral acid; an organic acid; or an organic base. Typically, it is the saponified or unsaponified microsurfacing emulsifier.

TABLE III

Asphalt With No Polymers
Results With Tall Oil Rosins With Rosin Content of 0-40%
Test Results After Distillation At 350° F.
Mix Temperature At 110° F.

| | Percent Rosins | | | | |
|---|---|---|---|---|---|
| | 0% | 10% | 20% | 30% | 40% |
| Penetration @ 77° F. | 100 | 90 | 79 | 68 | 60 |
| Absolute Viscosity | 107 | 112 | 115 | 119 | 122 |
| Ring & Ball Soft Point | 800 | 1100 | 1800 | 2400 | 3000 |

TABLE IV

Mix & Set Time vs. Hydrocarbon Chain Length
Polyamine Compound Diethylenetriamine
Mix Temperature At 110° F.

| Test | Unquaternized Compound | Quaternized Compound |
|---|---|---|
| $C_{18}$ | | |
| Mix | 30 sec. | 30 sec. |
| Break | 1 min. | 1 min. 15 sec. |
| Set | 2 min. | 2 min. 20 sec. |
| $C_{36}$ (Dimer with 10% Rosins) | | |
| Mix | 1 min. 5 sec. | 1 min. 30 sec. |
| Break | 1 min. 30 sec. | 2 min. |
| Set | 2 min. | 2 min. 30 sec. |

TABLE V

Mix & Set Time vs. Hydrocarbon Chain Length
Polyamine Compound Triethylene pentamine

| Test | Unquaternized Compound | Quaternized Compound |
|---|---|---|
| $C_{18}$ | | |
| Mix | 30 sec. | 30 sec. |
| Break | 1 min. | 1 min. 15 sec. |
| Set | 2 min. | 2 min. 20 sec. |
| $C_{36}$ (Dimer with 10% Rosins) | | |
| Mix | 1 min. 20 sec. | 1 min. 45 sec. |
| Break | 1 min. 45 sec. | 2 min. 15 sec. |
| Set | 2 min. 15 sec. | 2 min. 45 sec. |

TABLE VI

Polymer Type vs. Emulsion Distillation Properties

| Test | Polymer | | | | | | | |
|---|---|---|---|---|---|---|---|---|
| | 1 | 2 | 3 | 4 | 5 | 6 | 7 | 8 |
| Penetration | 62 | 59 | 66 | 60 | 76 | 70 | 93 | 65 |
| R & B Soft Pt. | 120 | 130 | 129 | 123 | 138 | 134 | 123 | 131 |
| Abs. Visc. | 2100 | 3500 | 3300 | 2400 | 9800 | 3800 | 2300 | 4500 |

Polymer Type:
1. None
2. Shell Kraton D-4455X (50% Shell Krator Linear SBS D1101 and 50% Shell Aromatic Extender Oil)
3. Shell Krator D-1320X (Branded SIS)
4. BASF SBR Latex NR-298
5. Gutherie High Ammonia Natural Latex
6. Fina Oil & Chem Finaprene 401
7. Cross Linked Housmex 1205 SB diblock
8. Ethylene Vinyl Acetate Melt Index 5-10, 20-30% Ethylene FOOTNOTE Emulsion distillation properties determined by 350° F. maximum distillation temperature from the following emulsion formula with the polymer based upon total 2.5% composition of emulsion by weight of the total emulsion:
2.0% $C_{20}$ emulsifier
1.5% HCl -
56.5% Tulsa Sinclair AC-20

TABLE VI-continued

Polymer Type vs. Emulsion Distillation Properties 40.0% Water

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An asphalt emulsion which includes water, asphalt, acid and an emulsifying agent which comprises:
   said emulsifying agent being a reaction product of a polyamine and a fatty acid having more than 20 carbon atoms.

2. An asphalt emulsion as set forth in claim 1 wherein said emulsifying agent is prepared by a process which comprises reacting said polyamine and said fatty acid at a temperature of at least 100° to 150° F., followed by condensing at a temperature of at least 280° to 300° F.

3. An asphalt emulsion as set forth in claim 2 including the additional step of cyclizing the condensation product at a temperature of at least 400° F.

4. An asphalt emulsion as set forth in claim 3 including the additional step of quaternizing said product by reacting said product with a sulfate compound.

5. An asphalt emulsion as set forth in claim 4 wherein said sulfate compound is chosen from a group consisting of dimethyl sulfate, diethyl sulfate and dipropyl sulfate.

6. An asphalt emulsion as set forth in claim 5 including the additional step of quaternization of the production by reacting said product with a sulfate compound at a temperature of at least 150° F.

7. The emulsion of claim 1 wherein the polyamine compound can be selected from the list consisting of ethylenediamine, diethylenediamine, diethylenetriamine, triethylenetetramine, tetraethylene pentamine, and aminoethyl ethanolamine.

8. The emulsion of claim 1 wherein the $C_{20+}$ fatty acid is dimerized tall oil rosin with a rosin content between 8 to 40%.

9. An asphalt emulsion as set forth in claim 1, wherein a break control agent of solution or chemical type alkylated polyvinylpyrrolidone which are hydrophilic or hydrophobic in nature; polysiloxane compounds of the structure silicone hydroxide; an organic acid and a mineral base; an organic base with a mineral acid; an organic acid; or an organic base is added.

10. An asphalt emulsion as set forth in claim 1, wherein hydroxyl groups or functional or metalorganic moieties are located in the hydrophilic portion of the emulsifier.

* * * * *